(12) United States Patent
McCown et al.

(10) Patent No.: US 11,477,178 B1
(45) Date of Patent: Oct. 18, 2022

(54) APPARATUS AND METHOD FOR EVALUATING AND MODIFYING DATA ASSOCIATED WITH DIGITAL IDENTITIES

(71) Applicant: Anonyome Labs, Inc., Draper, UT (US)

(72) Inventors: Steven Harvey McCown, Mapleton, UT (US); Paul Ashley, Toowong (AU); Matthew Poulton, Saint George, UT (US); Steve Shillingford, Draper, UT (US); Greg Clark, San Francisco, CA (US)

(73) Assignee: Anonyome Labs, Inc., Salt Lake City, UT (US)

( * ) Notice: Subject to any disclaimer, the term of this patent is extended or adjusted under 35 U.S.C. 154(b) by 334 days.

(21) Appl. No.: 15/836,712

(22) Filed: Dec. 8, 2017

Related U.S. Application Data

(60) Provisional application No. 62/504,383, filed on May 10, 2017.

(51) Int. Cl.
   *G06F 7/04* (2006.01)
   *H04L 9/40* (2022.01)
   *G06F 21/62* (2013.01)
   *G06F 21/60* (2013.01)

(52) U.S. Cl.
   CPC .......... *H04L 63/06* (2013.01); *G06F 21/602* (2013.01); *G06F 21/6245* (2013.01); *H04L 63/0428* (2013.01)

(58) Field of Classification Search
   CPC . H04L 63/06; H04L 63/0428; G06F 21/6245; G06F 21/602
   See application file for complete search history.

(56) References Cited

U.S. PATENT DOCUMENTS

| | | |
|---|---|---|
| 9,372,987 B1 | 6/2016 | Ashley et al. |
| 9,374,689 B1 | 6/2016 | Ashley et al. |
| 9,703,986 B1 | 7/2017 | Ashley et al. |
| 9,729,519 B1 | 8/2017 | Ashley et al. |
| 10,178,106 B1 | 1/2019 | Ashley et al. |
| 10,320,753 B1 | 6/2019 | Ashley et al. |
| 2005/0288939 A1* | 12/2005 | Peled ............... G06F 21/10 709/229 |
| 2010/0083318 A1* | 4/2010 | Weare ............... G11B 27/105 725/46 |
| 2012/0116923 A1* | 5/2012 | Irving ............... G06Q 30/0609 705/27.1 |
| 2015/0199523 A1* | 7/2015 | Hamilton ........... G06F 21/6245 726/27 |
| 2017/0270181 A1* | 9/2017 | Lindner ............. G06F 16/215 |

* cited by examiner

*Primary Examiner* — Fatoumata Traore
*Assistant Examiner* — Carlton Johnson
(74) *Attorney, Agent, or Firm* — Cooley LLP

(57) ABSTRACT

An apparatus has a processor and a memory connected to the processor. The memory stores instructions executed by the processor to store identity attributes including real identity attributes for a real individual and at least two sets of digital identity attributes each operative as a personal privacy proxy with compartmental identity attributes. The at least two sets of digital identity attributes each include a digital identity name, a digital identity mobile device number and a digital identity email address. The at least two sets of digital identity attributes are evaluated to produce a similarity measure. The real individual is provided with a recommendation based upon the similarity measure.

9 Claims, 5 Drawing Sheets

Compartmentalized Computing Environments 100

| Home Environment 102 | Work Environment 104 | Activist Environment 106 |
|---|---|---|
| Email Address -- 103 | Email Address | Email Address |
| Phone Number | Phone Number | Phone Number |
| Credit Card Number | Credit Card Number | Credit Card Number |
| Web Browser Settings | Web Browser Settings | Web Browser Settings |
| -Configuration | -Configuration | -Configuration |
| -Privacy Controls | -Privacy Controls | -Privacy Controls |
| -Settings | -Settings | -Settings |
| Network Configuration | Network Configuration | Network Configuration |
| -Proxy Settings | -Proxy Settings | -Proxy Settings |
| Etc. | Etc. | Etc. |

APPARATUS AND METHOD FOR EVALUATING AND MODIFYING DATA ASSOCIATED WITH DIGITAL IDENTITIES

CROSS REFERENCE TO RELATED APPLICATION

This application claims priority to U.S. Provisional Patent Application Ser. No. 62/504,383, filed May 10, 2017, the contents of which are incorporated herein by reference.

FIELD OF THE INVENTION

This application relates generally to communications in computer networks. More particularly, this application relates to techniques for evaluating and modifying data associated with digital identities.

BACKGROUND OF THE INVENTION

Initially, a number of terms will be defined. As used herein, "Identity" refers to the characteristics determining who or what a person or thing is. A "Legal Identity" is a set of identifying attributes, as designated by a $3^{rd}$ Party, which are used for verification, validation and authentication. A "Digital Legal Identity" is a digital equivalent of a Legal Identity. A "Digital Identity" is a role-based digital identity that is created, controlled and managed by an individual and is used for verification, validation and authentication. Every individual has real identity attributes, such as name, email address, physical address, telephone number and the like. A digital identity has digital identity attributes operative as a personal privacy proxy with compartmental identity attributes. For example, a first digital identity may have a name, email address, physical address and telephone number different than the real identity attributes and also different than a second digital identity.

Online privacy is one of the most pressing topics in today's interconnected society. Some organizations exploit loose privacy protections for economic or other user tracking purposes, while most individuals look for ways to protect their Personally Identifiable Information (PII). PII may be shielded through the use of digital identities. A digital identity is a personal privacy proxy with compartmental identity attributes. The compartmental identity attributes may include a digital identity name, a digital identity phone number, and a digital identity email address.

There are commercially available applications that allow one to manage one or more digital identities, such as SudoApp from Anonyome Labs, Salt Lake City, Utah A related application, SudoPay, in the Sudo suite of applications, offers anonymous communication and payment services, segments user activities, and keeps critical PII data types separate from each other. This segmentation process provides a new level of protection, because it keeps online PII trackers from assembling full profiles of a user's data and online activities.

In some embodiments, users will use a copy of a Sudo application to create compartmentalized computing environments that will each contain different elements of a user's total PII. In such an embodiment, one compartmentalized computing environment may contain a user's work-related PII (e.g., work email, work phone, work credit card, work-related web browsing, and appropriate work-related security settings). Another compartmentalized computing environment may contain the user's home-related PII (e.g., home email, home/mobile phone, personal credit card, spare time web browsing, personal email & phone contacts, and appropriate security settings). In yet another compartmentalized computing environment, the user may have prepared it for (for example) political activism and may want it to be anonymous or at least kept separate from their work-related and home-related compartmentalized computing environments. The user may have created separate PII, which may contain elements such as: alternative email, alternative phone, alternative credit card, separate web browsing, and appropriate work-related security settings). While there may be numerous types of motivations for creating separate compartmentalized computing environments, it is clear that many elements are very different when compared to other compartmentalized computing environments, but also that most compartmentalized computing environments will contain some similar or identical elements (e.g., security settings might be identical despite being created for different purposes). Whether the data and application elements from different compartmentalized computing environments are similar or distinct depends greatly on the motivation for which the different compartmentalized computing environments are created. As an example, home and work environments may have more similar elements than would a work-related environment and an environment created to be used for political activism (for example). Each compartmentalized computing environment is a group of computing parameters that is a subset of all computing parameters associated with a real user's computer network activity.

As users employ a Sudo application to compartmentalize their PII, some users may occasionally forget to alternate between compartmentalized computing environments when performing sensitive online activities, such as banking, accessing medical records, etc. This will lead to questions such as:

"How similar (or different) is my PII within this compartmentalized computing environment to (or from) my PII contained within another of my compartmentalized computing environments?

"What do I need to do or change in order to make my PII contained within this compartmentalized computing environment more distinct from (or more similar to) my PII that I've used in another of my compartmentalized computing environments?"

"Can I purge PII that has been added to one of my compartmentalized computing environments?"

It would be desirable to provide techniques for managing user information (with particular attention on PII) such that a user has finer grained control of the identity management process.

SUMMARY OF THE INVENTION

An apparatus has a processor and a memory connected to the processor. The memory stores instructions executed by the processor to store identity attributes including real identity attributes for a real individual and at least two sets of digital identity attributes each operative as a personal privacy proxy with compartmental identity attributes. The at least two sets of digital identity attributes each include a digital identity name, a digital identity mobile device number and a digital identity email address. The at least two sets of digital identity attributes are evaluated to produce a similarity measure. The real individual is provided with a recommendation based upon the similarity measure.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
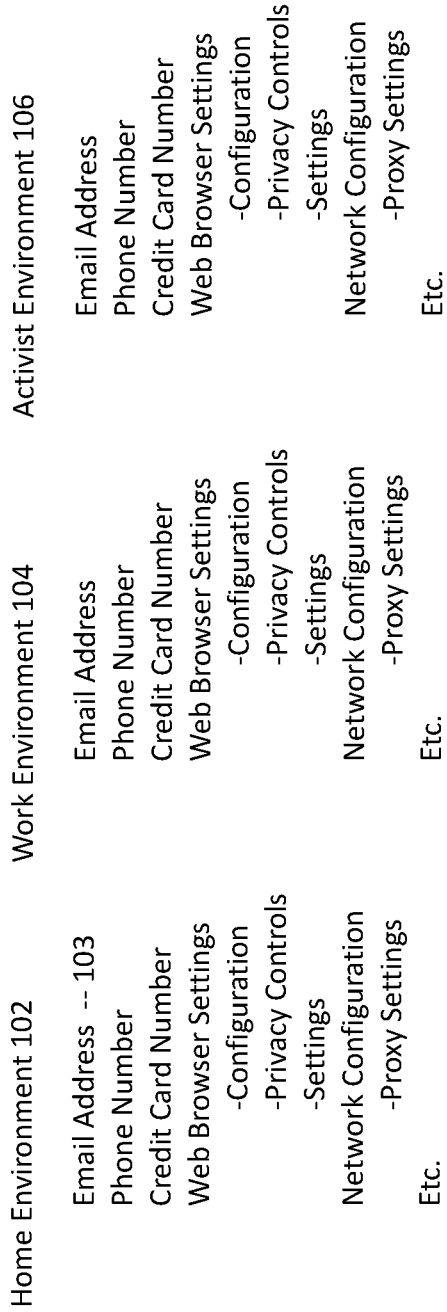
FIG. 1 illustrates compartmentalized computing environments formed in accordance with an embodiment of the invention.

Many websites deploy various types of tracking cookies and/or tracking objects in the webpages that they provide for download. Additionally, downloads may also include applications, plug-ins, or other 'active' content. These tracking mechanisms are meant to solicit, record, and exfiltrate user or device information.

As an example, one current tracking method is HTML Canvas Fingerprinting (Source: Pixel Perfect: Fingerprinting Canvas in HTML5, http://w2spconf.com/2012/papers/w2sp12-final4.pdf), which uses the HTML canvas object to print a textual image on the screen, perform a screen capture of the canvas area, and then upload the resulting image to the host server for analysis. Since each operating system, web browser, and their respective versions renders the textual information slightly different from one another, capturing this screen image allows a remote website to determine which operating system and browser combination the user is using to access the website.

While learning the operating system and browser combination of a website visitor may seem innocuous, in reality, it can provide a hostile website with key information that it can use to capture PII or launch exploits that may compromise the visitor's electronic device.

In order to block remote sites from gathering and exfiltrating user data or to enable the system to return an erroneous response, it is important to first make the user aware of all hardware and system parameters that describe the user's electronic device.

An audit of the host electronic device would include information such as (but not limited to):

System State (current state plus change history)
1) Computer System
   a. Hardware fingerprint (e.g., CPU, memory, devices, versions, etc.)
   b. Hardware configuration settings
   c. Firmware versions (e.g., current version, update history, etc.)
   d. External connection profiles
      i. External hardware connections (e.g., USB devices, printers, monitors, etc.)
      ii. External wireless connections (e.g., Wi-Fi access points, NFC, Bluetooth, etc.)
2) System and Application Setup and Usage
   a. System setup (e.g., configuration settings, helper apps, etc.)
   b. Applications (e.g., apps/versions installed, configurations, update status, etc.)
   c. Logs (e.g., system, application, etc.)
   d. Usage
      i. Login times/frequency
      ii. App usage frequency/history/stored data
      iii. Update history
3) Online Activity (because usage can change the browser's footprint)
   a. Browser's installed and whether each is used
   b. Accessed websites (e.g., browsing history, frequency, saved/favorites, cookies, cache, etc. for each browser)
   c. Saved Information (e.g., credit card information, auto-fill information, PII, browser settings, etc.)
   d. Saved accounts (e.g., website URL, login credentials, 2-factor authentication settings, etc.)
   e. Add-on components (e.g., plugins, default 'helper' apps that use web data such as image types to launch applications, etc.)

A compartmentalized computing environment is defined as an application (or specified set of applications) that confines user activity, data, or any added executable code to particular sections of memory, specific applications, or other designated software or hardware subsystems. The compartmentalized computing environment's purpose is to keep executable code and data from accessing or affecting resources outside of the compartmentalized computing environment or manipulating the same within the compartmentalized computing environment beyond that which is originally intended by the real user.

FIG. 1 illustrates compartmentalized computing environments 100 including a home environment 102 with various parameters 103, such as email address, phone number, credit card number, web browser settings, network configuration and the like. The work environment 104 has its own set of parameters, as does an activist environment 106.

Figure 2:
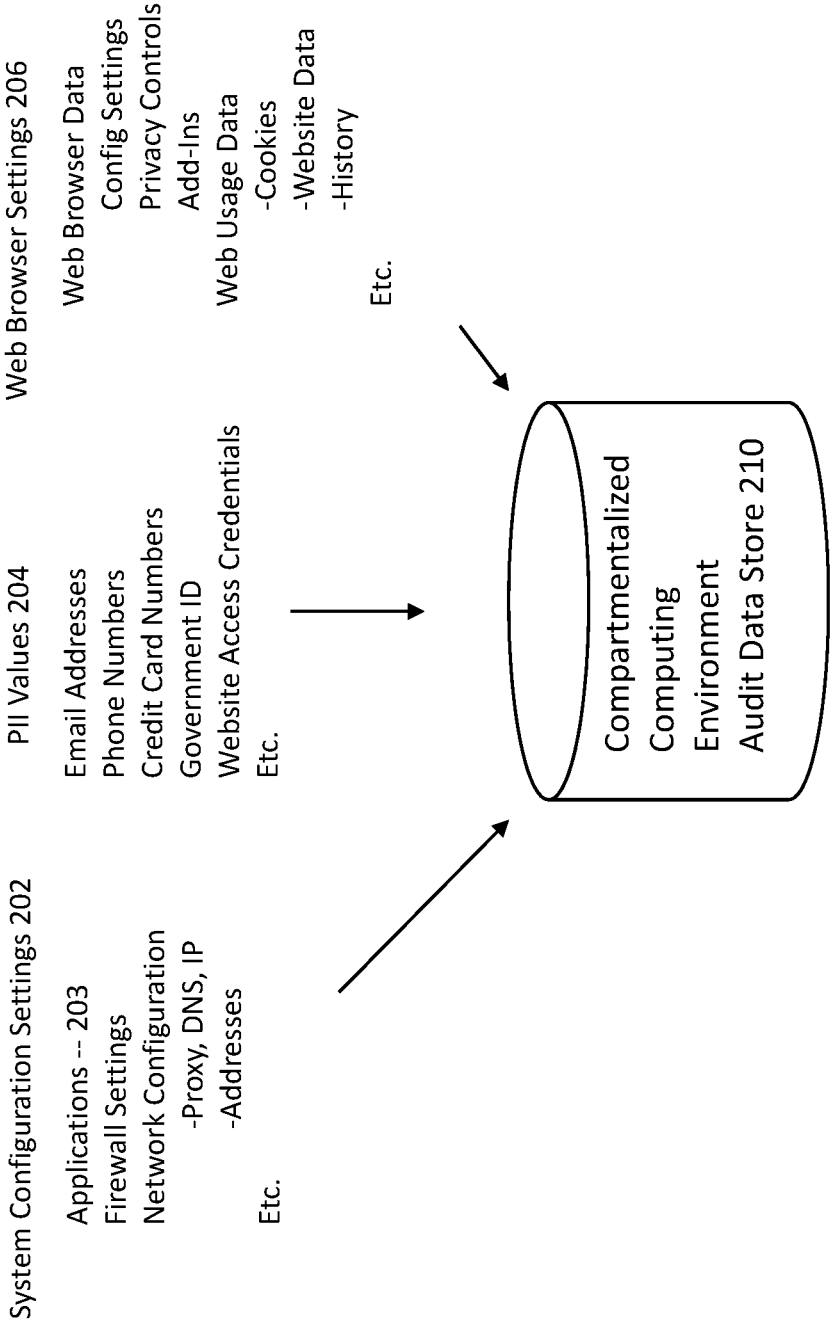
FIG. 2 illustrates an audit process performed in accordance with an embodiment of the invention.

In order to maintain compartmentalized computing environment integrity, a compartmentalized computing environment audit process 200, shown in FIG. 2, is employed. System configuration settings, with various parameters 203 are loaded into a compartmentalized computing environment audit data store 210. Similarly, PII values 204 and web browser settings 206 are loaded into the compartmentalized computing environment audit data store 210. In the event that compartmentalized computing environment rules are violated, the auditing process 200 either flags, alarms, continues monitoring, or halts operations when non-conforming activity is discovered.

These monitoring processes (which perform ongoing 'System Integrity and Configuration Audits') are not only beneficial for maintaining the integrity of the compartmentalized computing environment during normal operations, but they can also provide some important beneficial insights if presented to end users. With system integrity audit information, users are better informed about the continual operation of their compartmentalized computing environment.

Once they have the system integrity and configuration audit information, users may desire to make changes to the data, systems, and configurations reported in the audit reports. Some changes should be automatic, such as a firewall acting to block intrusion attempts, but other changes (e.g., determining which email address should be used as the default for a compartmentalized computing environment) should require interaction from the user who will determine the appropriate course of action.

The system integrity and configuration audit reports are most easily kept in a secure local database and may be transferred to authorized user interface presentation processes using an encrypted file containing an XML, format.

In today's interconnected society, many users have more than one electronic device. For example, they may have a cell phone, tablet, laptop, and/or a desktop computer. It is cumbersome for users to have to reconfigure each of their devices individually. To simplify user operations, it may be desirable to securely transfer the system integrity and configuration audit reports between each of the user's devices. This enables each device to compare its own operations and settings to those of its companion environments on the other devices belonging to the specified user.

Figure 3:
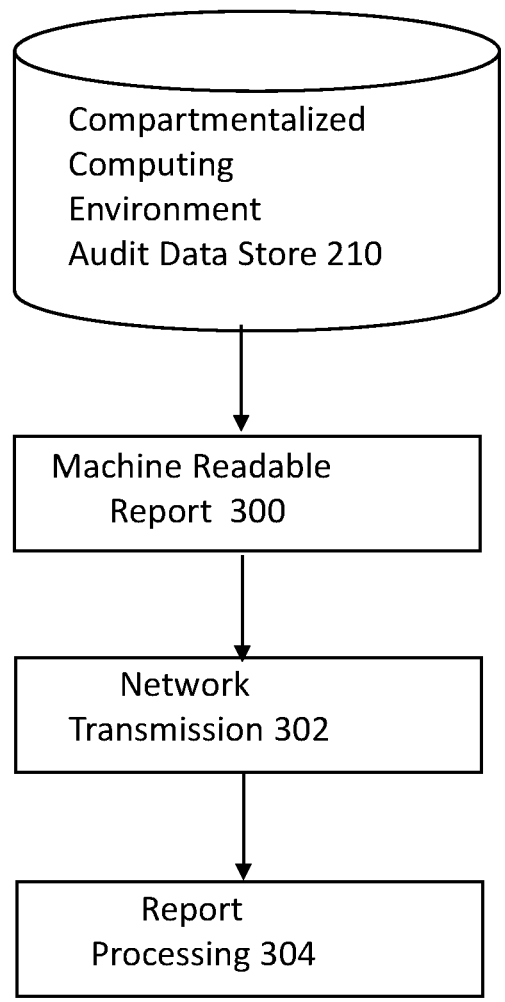
FIG. 3 illustrates data processing performed in accordance with an embodiment of the invention.

The system integrity and configuration audit reports contain very sensitive PII and therefore extra caution is used when transferring these reports to other devices. For example, the system integrity and configuration audit reports should be strongly encrypted and signed prior to transmission and reception by the destination device should be confirmed. FIG. 3 illustrates an exemplary process FIG. 3 illustrates the compartmentalized computing environment audit data store 210 forming a machine readable report 300 (e.g., in XML). The report is encrypted and signed and is then transmitted over a network 302. An end user device may perform report processing 304. The report processing 304 may be simply viewing a report processed by the audit data store 210. Alternately, the report processing 304 may include processing information in a machine readable report.

Once the system integrity and configuration audit reports have been received by a user's other device(s), it is desirable to compare the remote reports with similar reports conducted on the local device. This highlights potential areas of concern that the user may want to address.

Figure 4:
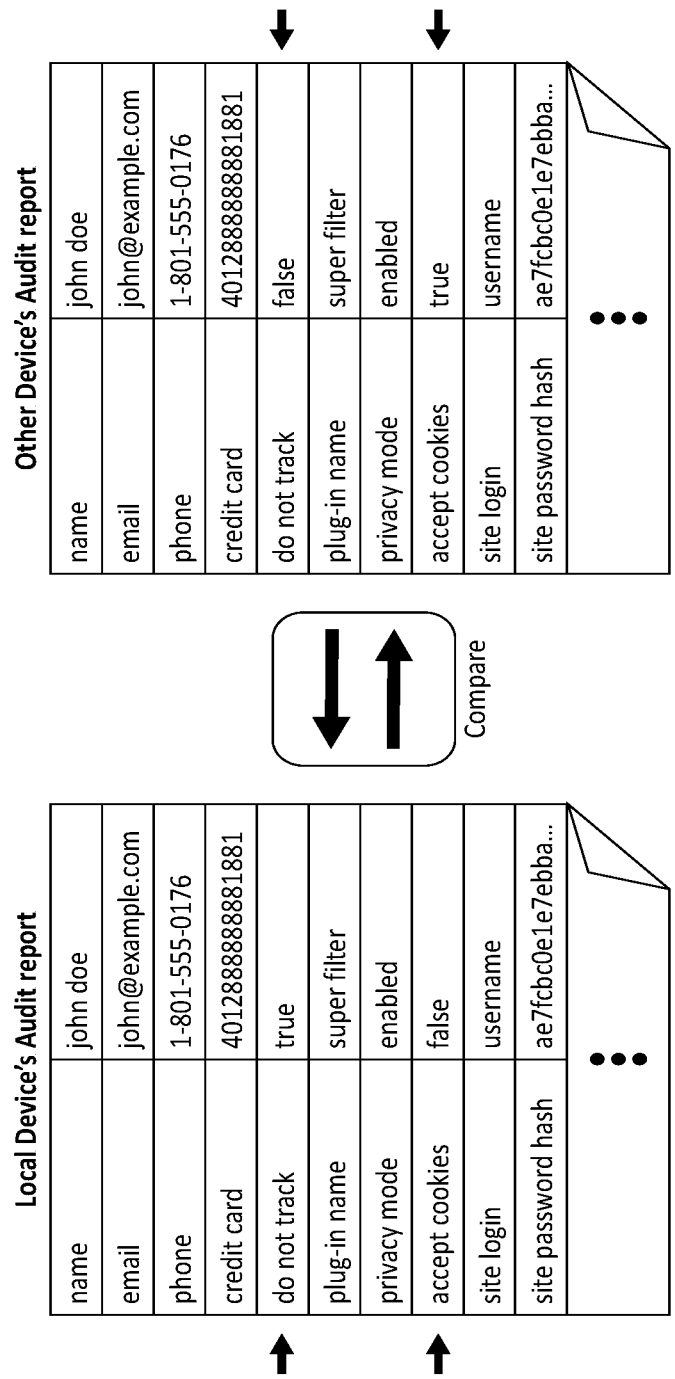
FIG. 4 illustrates an audit process to generate similarity measures in accordance with an embodiment of the invention.

In addition to simple one-to-one comparisons, it may be desirable to compare the user's local settings with expertly determined "best practice" settings. It is important to note that the system integrity and configuration audit reports contain very sensitive PII data, system settings, and configuration settings related to the compartmentalized computing environment and its operation. As a result, it is desirable that the "expert settings" rules be transferred to the local device for comparison. This is similar to how other security operations (e.g., virus scanning) are performed. FIG. 4 shows how sample data may be compared between local and remote system integrity and configuration audit reports.

While local comparisons of system integrity and configuration audit report findings are the most secure, occasionally, it might be necessary to perform this comparison on a remote server. One example of when these potential security issues may constitute acceptable risk is when the user is an employee and the remote computer is operated by the employee's employer. Even in this instance, very strong encryption and security processes should be used to transmit and handle the data. For example, a user device may be used to generate an audit report. The user device encrypts the report and securely transmits it over a network to a server that analyzes the audit report in view of a set of rules that establish best practices. The server generates a risk analysis and recommendation report, which is encrypted and security transmitted over the network. The user device receives, decrypts and displays the risk analysis and recommendations report. In one embodiment, a user is prompted to accept or reject individual report items.

In some instances it might be desirable to compare a user's system integrity and configuration audit report information with that of another user who is not the user's employer. Such instances include when the first user is a child and the second user is a parent. In this case, the parent-child relationship constitutes one of oversight and responsibility, so it is appropriate that the user's data be compared even though the users are distinct. As with any other transfer of sensitive PII, strong cryptographic and security processes should be employed. For example, first and second user devices may separately create audit reports, which are encrypted and then communicated over a network. Each user device receives, decrypts, processes and analyzes the received report. The user is prompted to selectively accept or reject audit report recommendations.

Other pre-defined digital entity relationships that may be specified include peer-based relationships (e.g., members of a club or organization), ad hoc relationships (e.g., two people with no apparent relationship) and legal relationships (e.g., law enforcement entity and investigation target entity).

Once the system integrity and configuration audit reports have been compared, it may be determined that some of the information should be changed. In some instances, these changes may be made to conform to "best practices". However, in other instances, a politically-active user (for example) with a compartmentalized computing environment created for that purpose may want to ensure that their politically-active (for example) compartmentalized computing environment audit report data be as different as possible from their work-related compartmentalized computing environment audit report.

In above scenario, the system integrity and configuration audit report comparison process presents configuration modification settings to the user through a contemporary user interface/user experience presentation process. This process allows the user to view/compare existing settings, make manual modifications, and also view "best practices" settings. Since the user, in this scenario, is seeking to more greatly disassociate the two environments, the "best practices" suggestions present suggestions that support that purpose. The following data flow outline shows an embodiment of the invention:

1) User Device creates system integrity and audit report for compartmentalized computing environment #1
2) User Device creates system integrity and audit report for compartmentalized computing environment #2
3) User Device iteratively compares items from Report #1 and Report #2
   a. If item values from both reports are different, continue to next iteration
   b. If item values are the same (or similar)
      i. Prompt user to keep or update setting in Report #1 (or Report #2). Update values, if necessary
   c. For items not found in both reports
      i. Prompt user to determine whether to add the missing item found in Report #2 to Report #1 (or vice versa). Update values, if necessary.
   d. Optional: Validate item settings with audit report comparison server
      i. If item settings are different:
         1. Continue to next iteration
      ii. Else if item settings are the same (or similar)
         1. Prompt user to determine whether to update the item in Report #1 with the item from the audit report comparison server. Make update, if necessary
   e. Loop until all items have been verified
4) If any changes have been made to the report data, then update the corresponding user device with the modified report data values.

Once the system integrity and configuration audit reports have been compared, it may be determined that some of the information should be changed. In some instances, these changes may be made to conform to "best practices". However, in other instances, a home user with a compartmentalized computing environment created for that purpose may want to ensure that their home-based audit report data be brought a little more closely in line with their work-related audit report. As an example of desired similarities, in this scenario, the user's mobile phone # or home address will often be the same regardless of whether the user is operating their home-based environment or their work-related environment.

In above scenario, the system integrity and configuration audit report comparison process presents configuration modification settings to the user through a contemporary User Interface/User Experience presentation process. This process allows the user to view/compare existing settings, make manual modifications, and also view "best practices" settings. Since the user, in this scenario, would be seeking to more greatly associate or align different environments, the "best practices" suggestions present suggestions that support that purpose. The following data flow outline shows how this process is done:

1) User device creates system integrity and audit report for compartmentalized computer environment #1
2) User device creates system integrity and audit report for compartmentalized computing environment #2
3) User Device Iteratively compares items from Report #1 and Report #2
   a. If item values from both reports are equal, continue to next iteration
   b. If item values are different
      i. Prompt user to keep or update setting in Report #1 (or Report #2). Update values, if necessary
   c. For items not found in both reports
      i. Prompt user to determine whether to add the missing item found in Report #2 to Report #1 (or vice versa). Update values, if necessary.
   d. Optional: Validate item settings with audit report comparison server
      i. If item settings are the same:
         1. Continue to next iteration
      ii. Else if item settings are different
         1. Prompt user to determine whether to update the item in Report #1 with the item from the audit report comparison server. Make update, if necessary
   e. Loop until all items have been verified
4) If any changes have been made to the report data, then update the corresponding user device with the modified report data values.

In the previous sections, processes are presented whereby system integrity and configuration data are collected from a specific compartmentalized computing environment on a given user device. These sections then describe processes for comparing the collected system integrity and configuration data with other processes on a user device, with another user's user device, or even with an audit report comparison server. These processes may be either manual or automatic.

In this section, it is presented that the system integrity and configuration audit report data may be converted from a more tabular format corresponding to traditional databases and converted into weighted graphs and/or other weighted relationship graphing methods. Using these types of comparative mapping techniques allows each system integrity and configuration audit report data item to be given a weighted value to denote importance, desirability, likelihood of occurrence, relationship with other report data items, etc. This weighted value may also denote a common value that in some embodiments may be used to depict or specify relationships between other report data items or denote groups of report data items. The purpose of identifying groups of related report data items could include denoting how certain groups of report data items might relate to one another, such as to show which groups are likely to occur in clusters or which groups might not tend to occur when other groups occur, etc. The graphing and comparative methods help users identify patterns in report data that could be used to depict favorability or other relationships between items described in system integrity and configuration audit report data There are many different methods for creating weighted relationship mappings and comparing the results. For example, some configuration audit report data comprises textual string data (e.g., name, email address, phone number, etc.). This information could be compared for similarity or difference using one of many string distance algorithms. Such algorithms include algorithms such as Hamming distance, Levenshtein distance, Damerau-Levenshtein, Optimal String Alignment, and the like.

As an example, Hamming distance is a well-known method for comparing two equal length strings by calculating the number of character digits that differ between the two strings. Using this method, two strings, 'Hanson' and 'Hansen', are both 6-character name strings. Since they differ by 1 digit, the Hamming distance is 1. Since there are 6 characters, their Hamming distance can be expressed by 0.16 (since 1/6 of the digits are different). Using this, and similar methods, the difference between textual values can be calculated and compared to determine either difference or similarity.

Once the system integrity and configuration audit report has been reviewed by the user/owner of the compartmentalized computing environment, they may determine that some of the information should be changed. In some instances, these changes may be made to conform to "best practices". However, in other instances, the user may determine that some of the data items or configuration settings should be removed from their secure environment.

As an example, the user may have entered some credit card information on a website and discovered that it is now saved in their compartmentalized computing environment as identified in the system integrity and configuration audit report. In this scenario, the presentation of the system integrity and configuration audit report should enable the user to selectively delete specific data items or applications.

Once the system integrity and configuration audit report has been reviewed by the user/owner of the compartmentalized computing environment, they may determine that the information is incomplete. In some instances, these changes may be made to conform to "best practices". However, in other instances, the user may determine that some of the data, applications, or configuration settings that they thought should have been already included may simply need to be added.

As an example, the user may wish to include their preferred email address or social media login information, so that it is set as a default. In this scenario, the presentation of the system integrity and configuration audit report should enable the user to selectively add specific data items, applications, or configuration settings.

Figure 5:
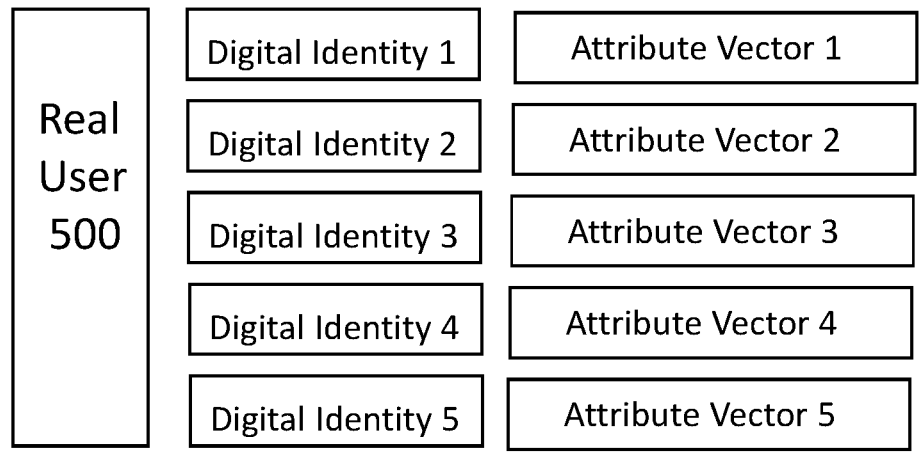
FIG. 5 represents a real user with five associated digital identities, each of which has an attribute vector.

FIG. 5 depicts a real user 500 with a set of digital identities (i.e., digital identity 1, digital identity 2, digital identity 3, digital identity 4 and digital identity 5). Each digital identity has an associated attribute vector. For example, digital identity 1 has attribute vector 1. The vector is a combination of attributes associated with a digital identity. For example, it may be a combination of a user name, email, phone number and characterization of online activity. In other words, the vector is a calculable representation of each attribute of a digital identity. A calculable representation may take the form of a numeric value, a binary value, a textual string, or other construct that represents the attribute within the vector. In another embodiment, attributes may be converted into numeric values and concatenated to form a vector.

Once a vector for each identity to be compared has been created, a mathematical equation (e.g., a function or formula) is applied to two vectors in order to create a resulting value. This resulting value will be compared to a pre-defined threshold value, which will then be used to determine the level of similarity or difference. In one embodiment, this comparative function may take the form of a Pair-Wise Similarity calculation. As the data to be compared becomes more complex, this type of comparative function will also increase in complexity or alternative functions may be substituted. This allows for numerous types of comparisons to be performed for various types of vectors. The following steps describe how the above process may be performed to create a series of similar or dissimilar digital identities:

1. Establish threshold values that specify the acceptable level of similarity or dissimilarity between digital identities
2. Create a new digital identity
    1. Automatic: create a new digital identity according to a set of user or system-specified input attributes. Such input attributes may include: name(s), geographic location(s), physical attributes, date of birth, interest(s), hobbies, work history, etc.
    2. In order to improve realism in the new digital identity, these attributes could be copied from other legal or digital identities, created by an intelligent method, or even input by a user.
3. After this new digital identity has been created, it undergoes a verification step to determine the level of similarity or dissimilarity between the new digital identity and a user's other digital identities, as specified. This is accomplished by the following:
    1. Each digital identity is represented as a numeric vector based on the digital identity's attributes.
    2. Pair-wise similarity calculations (e.g. Euclidean, Manhattan, cosine, etc.) are performed on target digital identities to indicate a measure of similarity between attributes.
    3. If the resulting similarity value is within the acceptable threshold, then the process ends. If the resulting similarity value is not within the acceptable threshold limits, then adjusted attributes are set for the new digital identity and the process repeats until the specified similarity threshold values are achieved.
4. After a digital identity is created, a process to monitor similarity or dissimilarity between other digital identities is continuously or periodically performed. If necessary, adjustments in digital identity attributes can be made. This process alerts digital identity users if their activity caused two or more of their digital identities to become too similar or too different.

Figure 6:
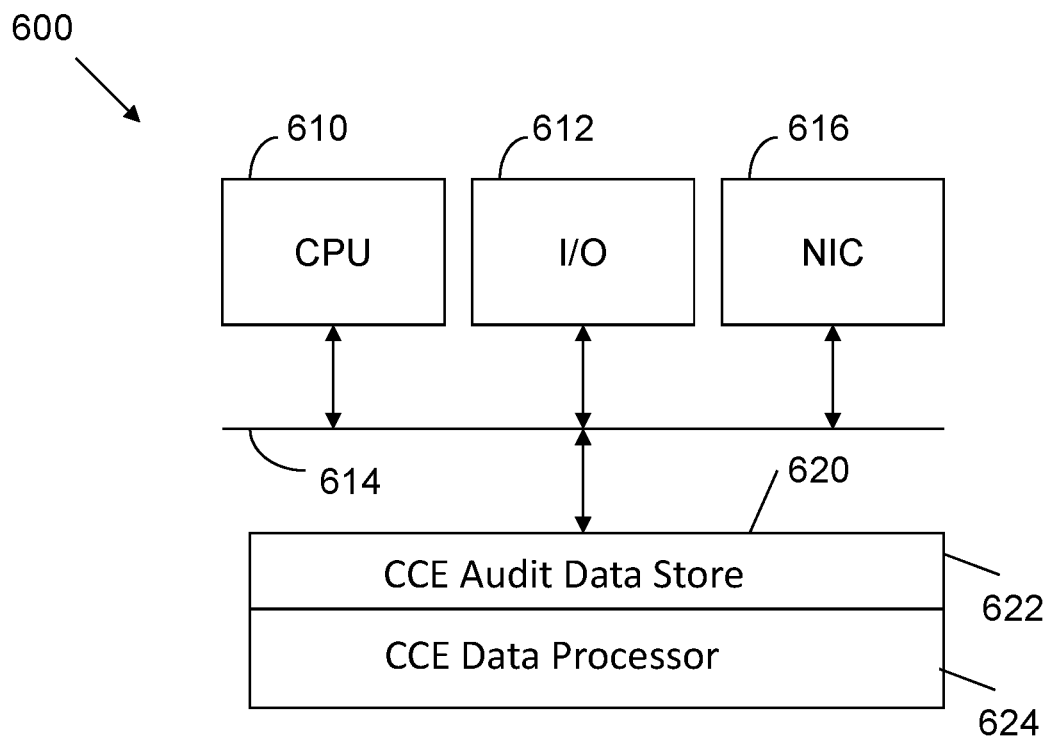
FIG. 6 illustrates a machine configured in accordance with an embodiment of the invention.

FIG. 6 illustrates a machine 600 configured in accordance with an embodiment of the invention. The machine 600 includes a processor (e.g., central processing unit or CPU) 610 connected to a set of input/output devices 612 via a bus 614. The input/output devices 612 may include a keyboard, mouse, touch display and the like. A network interface circuit 616 is also connected to bus 614 to provide connectivity to any combination of wired and wireless networks. A memory 620 is also connected to the bus 614. The memory 620 stores instructions executed by processor 610 to implement operations disclosed herein. For example, the memory 620 may store a compartmentalized computing environment (CCE) audit data store 622, which corresponds to compartmentalized computing environment audit data store 210 discussed in connection with FIG. 2. The memory 620 may also store a CCE data processor 624 to implement operations disclosed herein, such as operations to evaluate an audit report, generate measures of similarity, make recommendations to align digital identities, make recommendations to diversity digital identities and the like. Machine 600 may be any one of the disclosed user devices or servers discussed herein.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory connected to the processor, the memory storing instructions executed by the processor to:
store identity attributes including real identity attributes for a real individual and at least two sets of digital identity attributes each operative as a personal privacy proxy with compartmental identity attributes, wherein the at least two sets of digital identity attributes each include a digital identity name, a digital identity mobile device number, and a digital identity email address, evaluate the at least two sets of digital identity attributes to produce a similarity measure, wherein the similarity measure is derived from a comparison of vectors with calculable representations of the at least two sets of digital identity attributes, provide the real individual with a recommendation based upon the similarity measure, wherein the recommendation relates to a suggested alteration of a digital identity attribute to alter the similarity measure to disassociate the two sets of digital identity attributes and thereby render the compartmental identity attributes of the two sets of digital identity attributes as different as possible;

create a resulting value in response to adjustments in a numeric vector of digital identity attributes; and monitor a comparison of the resulting value to a threshold value to determine when digital identity attributes become too similar or too different.

2. The apparatus of claim 1 wherein the memory stores instructions executed by the processor to collect the identity attributes in a machine readable report.

3. The apparatus of claim 2 wherein the memory stores instructions executed by the processor to encrypt the machine readable report to form an encrypted report.

4. The apparatus of claim 3 wherein the memory stores instructions executed by the processor to transmit the encrypted report across a network.

5. The apparatus of claim 1 wherein the comparison of the vectors is a pair-wise similarity calculation.

6. The apparatus of claim 1 wherein providing the real individual with a recommendation is performed in response to the similarity measuring exceeding a pre-defined threshold.

7. The apparatus of claim 1 further comprising instructions executed by the processor to compare the at least two sets of digital identity attributes to a pre-defined set of digital identity attributes to produce a similarity measure.

8. The apparatus of claim 7 wherein the pre-defined set of digital identity attributes are associated with a pre-defined relationship.

9. The apparatus of claim 7 wherein the pre-defined set of digital identity attributes are best practice settings.

* * * * *